April 7, 1970          S. B. CAVITT          3,505,407
PURIFICATION OF METHOXYACETALDEHYDE
Filed Nov. 28, 1966
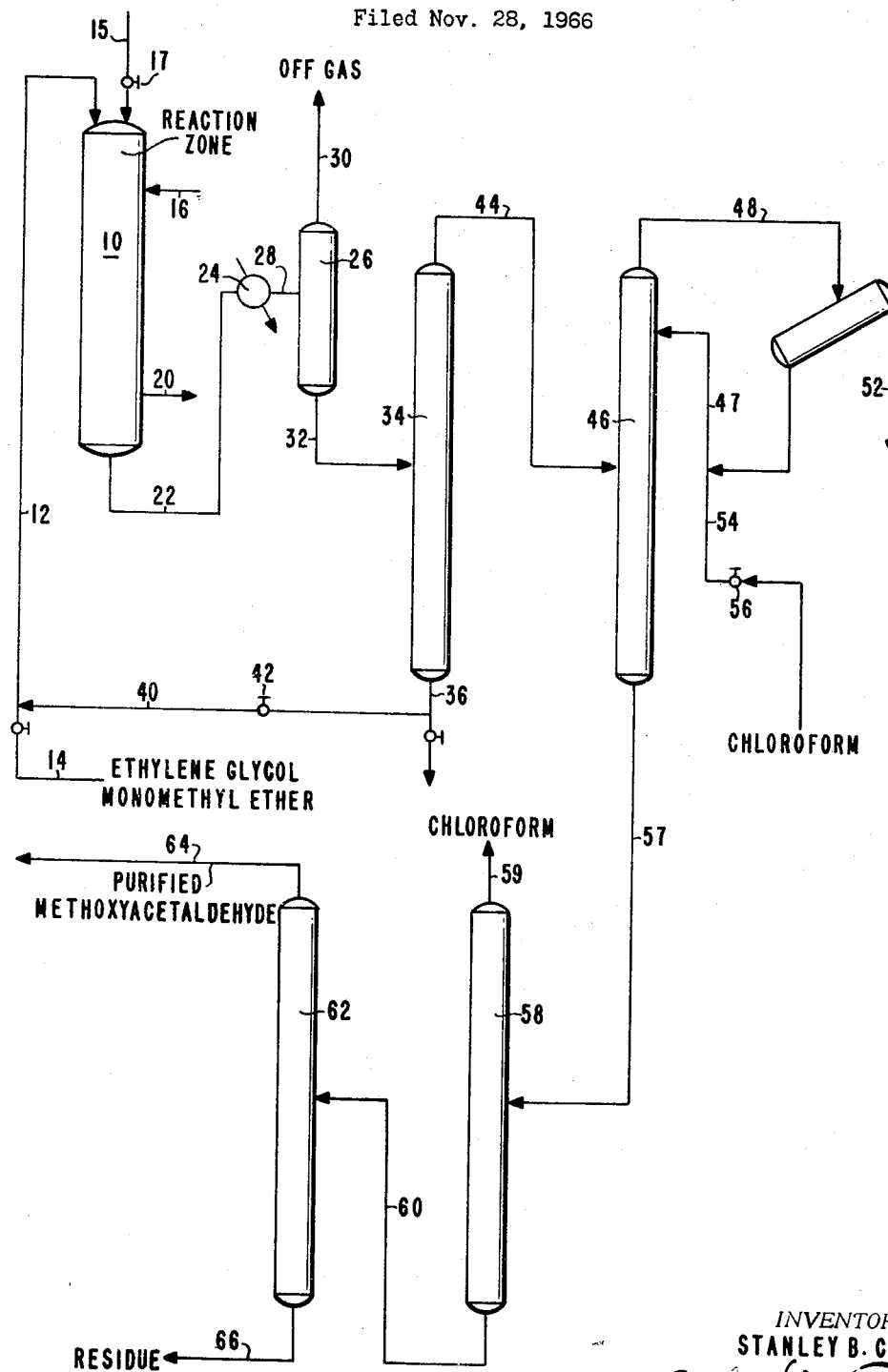
INVENTOR.
STANLEY B. CAVITT
BY
ATTORNEY.

United States Patent Office 3,505,407
Patented Apr. 7, 1970

3,505,407
PURIFICATION OF METHOXYACETALDEHYDE
Stanley B. Cavitt, Austin, Tex., assignor to Jefferson Chemical Company, Inc., Houston, Tex., a corporation of Delaware
Filed Nov. 28, 1966, Ser. No. 597,296
Int. Cl. C07c 40/24, 17/02; B01d 2/36
U.S. Cl. 260—602         2 Claims

ABSTRACT OF THE DISCLOSURE

Methoxyacetaldehyde, contaminated with methanol or methanol and water, may be recovered through an azeotropic distillation, utilizing chloroform as the azeotroping agent.

This invention relates to a method for the purification of methoxyacetaldehyde. More particularly, this invention relates to a method for the purification of methoxyacetaldehyde contaminated with methanol and water.

It has heretofore been proposed to prepare methoxyacetaldehyde by the oxidation of monomethyl glycol ether in the presence of a silver catalyst. Water is a by-product. Unfortunately, there has also been a concomitant production of a minor amount of methanol as a by-product.

Methoxyacetaldehyde boils at 92° C. and methanol at 64° C. at atmospheric pressure, but despite the 28° C. boiling point difference, a complete separation of methanol from methoxyacetaldehyde is accomplished only with great difficulty. This can be explained, at least in part, by the high reactivity of methoxyacetaldehyde and also by its strong association with polar substances. Thus, when a methoxyacetaldehyde fraction containing about 25% methanol was fractionated by batch distillation at atmospheric pressure using a three-quarter inch by four foot Stedman Column and a reflux ratio of 10:1, a methanol fraction was obtained at a head temperature of 64° C., after the head temperature rose to 85° C. and remained constant. However, the 85° C. fraction contained about 20% methanol.

It has been discovered in accordance with the present invention, moreover, that methoxyacetaldehyde also has an extremely high and unexpected tendency to form azeotropes and minimum boiling mixtures. For example, and for these reasons, attempts to recover substantially water and methanol-free methoxyacetaldehyde by azeotropic distillation were unsuccessful when the azeotroping agent was benzene, acetone, hexene-1, tetrachloroethylene, cyclohexane, a mixture of isopropanol with toluene and a mixture of n-propanol with n-propyl acetate. In like manner, extractive distillation was unsuccessful in the presence of ethylene glycol, diethylene glycol monomethyl ether and propylene carbonate. Attempts at water and methanol removal with 3-A, 4-A and 5-A molecular sieves were also unsuccessful. Thus, it was found that water could be removed by the molecular sieves when the feedstock was in the vapor state, but that the methanol remained in association with the methoxyacetaldehyde.

As can be seen from the foregoing, it would not be obvious or expected that an azeotroping agent could be found which could be used successfully to substantially remove both water and methanol from methoxyacetaldehyde.

It has been surprisingly discovered in accordance with the present invention, however, that methanol and water can be removed by submiting a methoxyacetaldehyde product which is contaminated with methanol and water to azeotropic distillation under neutral or slightly basic conditions (e.g., at a pH of about 7 to about 8) with chloroform to obtain a lower boiling distillate fraction containing chloroform, methanol and water and a higher boiling chloroform—methoxyacetaldehyde fraction substantially free from methanol and water and subjecting said higher boiling fraction to distillation to obtain a low-boiling distillate chloroform fraction and a high-boiling methoxyacetaldehyde product fraction containing only a minor amount of methanol.

When the azeotropic distillation is conducted under slightly basic or neutral conditions, the purified product is methoxyacetaldehyde. However, under acid conditions the methanol will react with the methoxyacetaldehyde to provide the dimethylacetal of methoxyacetaldehyde.

The crude methoxyacetaldehyde can be prepared from monomethyl glycol ether by catalytic oxidation in the presence of a silver catalyst as shown, for example, in United States Patents Nos. 2,000,604, 2,170,854, 2,286,034 and 2,590,896 and copending application Ser. No. 561,631, filed June 29, 1966 and entitled, "Production of Alkoxyacetaldehydes."

The invention will be further illustrated in connection with the accompanying drawing, wherein the single figure is a schematic flow sheet illustrating the preferred method for the practice of the present invention. In the interest of simplicity, conventional equipment associated with the reactor and distillation columns has been omitted, such as heat exchangers, reflux condensers, reboilers, temperature control devices, etc.

Turning now to the drawing, there is disclosed a reaction zone 10, to which monomethyl glycol ether (ethylene glycol monomethyl ether) is charged by way of a line 12 controlled by a valve 14. A dilute oxygen-containing feed gas, such as a mixture of air with an inert gas (e.g., nitrogen), is charged by way of a line 15 controlled by a valve 17. The temperature is suitably regulated within the reaction zone 10 by means of a heat exchange medium charged by way of a line 16 and withdrawn by way of a line 20 from a heat exchange space about reaction tubes within the reactor 10. Polyphenyls, such as diphenyl and polyphenyl oxides, are conveniently used as heat exchange media.

The effluent from the reactor 10 which is discharged by way of a line 22 will contain, for example, unreacted off gas and liquefiable components. The effluent is passed through a heat exchanger 24 where it is cooled and then to a drum 26 by way of a line 28 where off gas is separated by way of a line 30. The liquid components of the reaction mixture which are discharged from drum 26 by way of a line 32 will contain, for example, from about 40% to about 50% of methoxyacetaldehyde, from about 35% to about 45% of unreacted monomethyl glycol ether, from about 10 to about 15 wt. percent of water, from about 2% to about 4% of methanol and traces of formaldehyde.

The liquefied reaction product is charged by way of a line 32 to a first distillation column 34, where it is separated into a higher boiling monomethyl glycol ether recycle distillate fraction which is withdrawn from the tower 34 by way of a line 36 controlled by a valve 38 and is composed principally of unreacted monomethyl glycol ether. The fraction 36 may suitably be recycled by way of a line 40 controlled by a valve 42. A lower boiling fraction, withdrawn from the column 34 by way of a line 44, may contain, for example, about 80% methoxyacetaldehyde, about 12 to 15 wt. percent of water and about 3 to 5 wt. percent of methanol.

In order to overcome the problem of purification that is encountered because of the azeotropes that methoxyacetaldehyde forms with water and methanol, the fraction 44 is charged to a second distillation column 46, to which chloroform is also charged by way of a line 47 for azeotropic distillation in order to recover an overhead chloroform azeotrope fraction 48 containing most of the methanol and water and only a trace amount of methoxyacetaldehyde.

The fraction 48 is passed to a phase-separation zone 50 wherein it separates into an aqueous methanol fraction which is discarded by line 52 and chloroform fraction 47 which is preferably recycled to column 46. Fresh chloroform, if needed, may be charged to line 47 by a line 54 controlled by a valve 56.

Bottoms fraction 57 is a chloroform-methoxyacetaldehyde binary which is subjected to distillation in a third distillation column 58. In the column 58 the fraction 57 is separated into a distillate chloroform fraction 59 which may be recycled, in whole or in part, to column 46. The bottoms from the tower 58 contains a predominant amount of methoxyacetaldehyde and is suitably charged by way of a line 60 to a distillation zone 62, wherein an overhead methoxyacetaldehyde fraction 64 is obtained and from which a bottoms residue fraction 66 is discharged.

The invention will be further illustrated with respect to the following specific examples, which are given by way of illustration and not as limitations on the scope of this invention. Where parts are given, they are parts by weight.

EXAMPLE I

Reactor operation

Pellets of a silica-supported, copper-promoted silver catalyst containing about 25 wt. percent of silver were diluted with an equal volume of inert material (Alundum) and used to fill a bundle of one-inch, stainless steel tubes immersed in a liquid heat-transfer medium comprising a mixture of diphenyl and polyphenyl oxides. The reactor was brought to a temperature of about 300° to 350° C., with the heat transfer medium and nitrogen thereafter fed to the reactors. After nitrogen flow had been established, unheated monomethyl glycol ether was pumped through the system until a liquid effluent was obtained and thereafter air to the unit was begun, the air bleed to the nitrogen feed being such that the mixture contained about 4% of oxygen. The maximum temperature recorded in the catalyst tubes was from about 400° to about 450° C.

The oxygen flow rate with respect to monomethyl glycol ether flow rate was within the range of about 0.5 to about 0.6 mol of oxygen per mol of glycol ethers.

Under the above-described reaction conditions, yields and conversions of methoxyacetaldehyde of 83% and 72%, respectively, were obtained. These results were obtained with no pretreatment of the catalyst, and there was no observable deterioration of the catalyst or loss of activity of the catalyst over a period of more than 1,000 hours of use.

EXAMPLE II

The crude effluent from a single pass through the methoxyacetaldehyde reactor consisted typically of 40% to 50% methoxyacetaldehyde, 35% to 45% unreacted methyl glycol ether, 10% to 15% water, 2% to 4% methanol and traces of formaldehyde. Continuous distillation as in column 34 (FIGURE 1) produced a colorless product containing 79% to 80% methoxyacetaldehyde, 12% to 15% water and 3% to 5% methanol.

EXAMPLE III

Purification of methoxyacetaldehyde

To a 2,000 ml. separatory funnel were added 300 grams of 79% aqueous, methanolic methoxyacetaldehyde solution and 1,000 grams of chloroform. The mixture was shaken vigorously and allowed to stand until an aqueous layer had formed. The aqueous layer was separated and discarded and the turbid lower layer was charged to a 2,000 ml. distilling flask equipped with a thermometer and nitrogen bleed. An atmospheric distillation was carried out using an efficient fractionating column. The first fraction distilled at 52° to 53° C. and was a ternary azeotrope of water, 4%; chloroform, 81%; and methanol, 15% (reported B.P. 52.6° C.). The second fraction, B.P. 56°–57° C., was a binary azetrope of water, 2.8%; and chloroform, 97.2% (reported B.P. 56.1° C.). The third fraction, B.P. 60° to 61° C., was homogenous and corresponded to chloroform, B.P. 61° C. The distillation head temperature then rose steadily to 90° C., at which point essentially pure methoxyacetaldehyde began to distill. The fraction between 61° and 90° C. appeared to be a non-azeotropic mixture of chloroform and methoxyacetaldehyde. There was recovered 143 grams of methoxyacetaldehyde distilling at 90° to 91° C. Chromatographic analysis indicated the purity to be greater than 95%. Small quantities of water, methanol and chloroform were present.

EXAMPLE IV

Purification of methoxyacetaldehyde

To a 5,000 ml. flask equipped with a stirrer, thermometer, vacuum-jacketed column, condenser and azeotroping head were added 1,115 grams (1,000 ml.) of 79% aqueous, methanolic methoxyacetaldehyde and 2,940 grams (2,000 ml.) of chloroform (dried over anh. $K_2CO_3$). The mixture was refluxed with continuous removal of the aqueous layer and return of the lower layer to the distillation column. The aqueous layer appeared to be essentially free of methoxyacetaldehyde and amounted to 197 grams (theory—201 grams based on 18% water in starting material). The clear, homogenous solution of methoxyacetaldehyde and chloroform was distilled rapidly through a fractionating column after careful removal of product mixtures (mainly with water and methanol) to 90° C. There was recovered 607 grams (76% yield) of methoxyacetaldehyde, B.P. 90° to 91° C., and 152 grams of residue. The residue appeared to be composed primarily of methoxyacetaldehyde polymer and methoxyacetaldehyde dimethylacetal.

Having thus described the invention, what is claimed is:

1. A method for the purification of methoxyacetaldehyde contaminated with methanol and water which comprises the steps of subjecting said contaminated methoxyacetaldehyde to azeotropic distillation in the presence of chloroform to obtain a lower boiling distillate fraction containing water and most of said methanol and a higher boiling fraction composed primarily of methoxyacetaldehyde and subjecting said higher boiling fraction to distillation to obtain a distillate product consisting essentially of methoxyacetaldehyde and only a minor amount of methanol.

2. A method for the purification of a crude reaction product prepared by the catalytic oxidation of monomethyl glycol ether and comprising about 40% to 50% methoxyacetaldehyde, about 35% to 45% of monomethyl glycol ether and about 2% to 4% methanol which comprises the steps of subjecting said crude reaction product to simple distillation to obtain a first distillate fraction consisting essentially of methoxyacetaldehyde contaminated with water and methanol and a higher boiling fraction comprising unreacted monomethyl glycol ether, azeotropically distilling said first distillate fraction in the presence of chloroform to obtain an azeotrope fraction containing most of the methanol and water and a fourth methoxyacetaldehyde-chloroform fraction and subjecting said fourth fraction to distillation to obtain a methoxyacetaldehyde product consisting essentially of methoxyacetaldehyde and containing only a minor amount of methanol.

No references cited.

LEON ZITVER, Primary Examiner

R. H. LILES, Assistant Examiner

U.S. Cl. X.R.

203—67